F. X. LENK.
EAR TAG.
APPLICATION FILED APR. 15, 1916.
1,192,792.
Patented July 25, 1916.
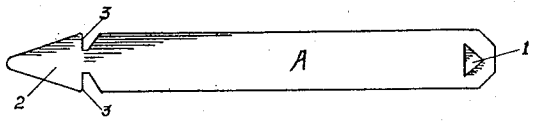
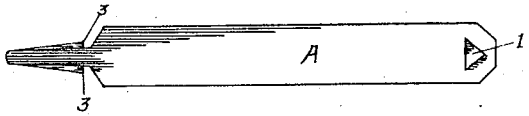
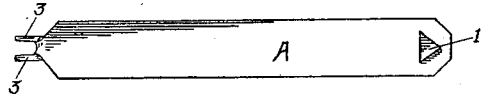
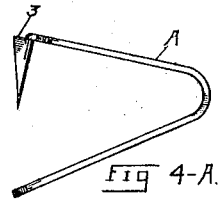
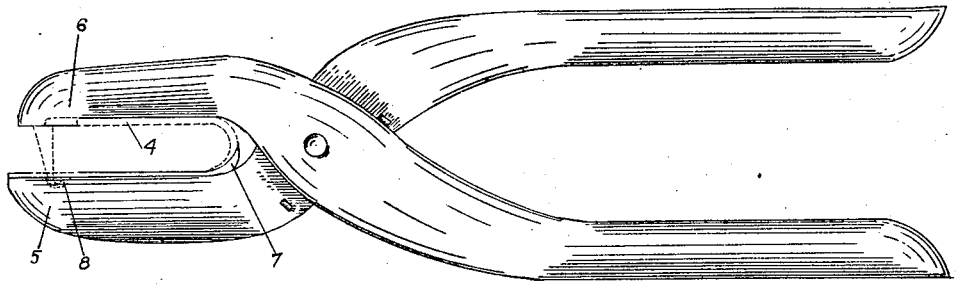
Frank X. Lenk
Inventor
Attorney

UNITED STATES PATENT OFFICE.

FRANK X. LENK, OF SALT LAKE CITY, UTAH.

EAR-TAG.

1,192,792. Specification of Letters Patent. Patented July 25, 1916.

Application filed April 15, 1916. Serial No. 91,483.

*To all whom it may concern:*

Be it known that I, FRANK X. LENK, a citizen of the United States, residing at Salt Lake City, in the county of Salt Lake and State of Utah, have invented certain new and useful Improvements in Ear-Tags, of which the following is a specification.

My invention relates to animal markers, and has for its object to provide an ear tag which may be easily and quickly secured through and clamped upon the ear of an animal for the purpose of identification.

These objects I accomplish with the device illustrated in the accompanying drawings in which similar letters and numerals of reference indicate like parts throughout the several figures, and as described in the specification forming a part of this application and pointed out in the appended claim.

In the drawings in which I have shown a substantial embodiment of my invention Figure 1 is a plan view of the tag as cut from a sheet of metal before it is bent into shape, Fig. 2 is the same after the ear piercing portion has received the first forming bend. Fig. 3 is an edge elevation of the same. Fig. 4 is a plan view of the tag after the ear piercing portion has received the next forming or right-angled bend. Fig. 4A is an edge elevation of the tag as completed and ready for use. Fig. 5 is the same after it has received the tong compression or bending. Fig. 6 is an inverted plan view of the same. Fig. 7 is a view of the tongs with one of my tags shown therein in dotted lines after it has been bent in the tongs.

In the use of ear tags heretofore provided similar in form and construction I find that when piercing the animal's ear and in bending the tag with the tongs that the point is not formed right and the pressure cannot be applied at the required place to readily pierce the animal's ear and clamp the tag in place. The present invention is intended to overcome such defects by providing a properly formed point on the ear piercing portion with such portion so constructed that pressure may be applied thereto and the tag firmly secured on the animal's ear, and on which tag any desired identification marks may be stamped or affixed.

The tag A is cut from sheet metal and a triangular opening 1 is cut in one end portion. The other end portion is first cut into a spade form as at 2 having shoulders 3 at right angles to the body of the tag, and with the point tapered to an edge. The said portion 2 is then bent by dies and the said shoulder portions 3 struck upwardly as flanges and the whole of said portion 2 bent downwardly at right angles to the body of the tag. The last described bending will bring the said shoulders 3 in a plane parallel with and in alinement with one side of the tag, as clearly shown in Fig. 5. The body of the tag is then bent on a curve at practically the middle point and is ready for use, and is shown in Fig. 4A.

A pair of tongs is used to insert and fasten the tag on the ear of the animal, preferably such tongs as are described and shown in my application for patent filed April 1916, a plan view of which is shown in Fig. 7. Recesses are cut in the inner faces of the jaws 5 and 6 of said tongs to receive the end portions of said tag, and the outer face of the body portion, and an inwardly curved lip 7 is provided in the said jaw 5 to hold said tag longitudinally and laterally. The tag is placed within the jaws of said tongs and when pressure is applied thereby the contact is against the outer faces of the body of the tag and the piercing and clamping pressure is applied particularly to the said shoulder portions 3. The said portion 2 of the tag is thereby driven squarely through the ear of the animal and through the opening 1 in the tag and the point is made to come into contact with the jaw 5 within a concaved recess 8 that is cut into the face of the said jaw. When enough pressure is applied through said tongs the point of the said portion 2 is bent and clamped as shown in Figs. 5 and 6.

Having thus described my invention I desire to secure by Letters Patent and claim:—

A device of the class described consisting of a single piece of sheet metal bent to form two opposed side portions one of which has a triangular opening cut therein, a channel shaped cutting and securing blade formed on and bent at right angles to the other side portion, and provided with shoulders in line with the inner face of said side portion to receive the pressure of the securing tongs in applying and securing the tag on the ear of the animal.

In testimony whereof I have affixed my signature in presence of a witness.

FRANK X. LENK.

Witness:
SAM RANEY.